United States Patent [19]

Ueda et al.

[11] Patent Number: 4,945,552
[45] Date of Patent: Jul. 31, 1990

[54] IMAGING SYSTEM FOR OBTAINING X-RAY ENERGY SUBTRACTION IMAGES

[75] Inventors: Ken Ueda, Ome; Keiji Umetani, Fuchu; Yoshio Suzuki, Kodaira, all of Japan

[73] Assignee: Hitachi, Ltd., Tokyo, Japan

[21] Appl. No.: 277,987

[22] Filed: Nov. 30, 1988

[30] Foreign Application Priority Data

Dec. 4, 1987 [JP] Japan ............................. 62-305625
Jan. 22, 1988 [JP] Japan ............................. 63-10648

[51] Int. Cl.$^5$ ............................................. H05G 1/64
[52] U.S. Cl. ........................................ 378/99; 378/156; 378/82
[58] Field of Search ................... 378/99, 62, 156, 82, 378/83, 84, 146; 358/111, 136; 128/654

[56] References Cited

U.S. PATENT DOCUMENTS

| | | | |
|---|---|---|---|
| 3,894,181 | 7/1975 | Mistretta et al. | 358/111 |
| 3,924,133 | 12/1975 | Reiss | 378/111 |
| 4,432,370 | 2/1984 | Hughes et al. | 128/654 |
| 4,482,918 | 11/1984 | Keyes et al. | 358/111 |
| 4,611,341 | 9/1986 | Brody | 378/99 |
| 4,736,398 | 4/1988 | Graeff et al. | 378/99 |

Primary Examiner—Craig E. Church
Attorney, Agent, or Firm—Antonelli, Terry, Stout & Kraus

[57] ABSTRACT

An energy subtraction image measuring system for selectively depicting any target element using X-rays includes an X-ray filter containing the target element. It measures an X-ray image by using a quasi-monoenergetic X-ray beam obtained without using the filter and having a photon energy range that extends above and below the absorption edge of the target element, as well as an X-ray image using an X-ray beam containing only the photon energy component having photon energy levels lower than the absorption edge which is obtained by using the filter. The energy subtraction image measuring system then generates an energy substraction image by the operation of the thus obtained data.

13 Claims, 5 Drawing Sheets

IMAGING SYSTEM FOR OBTAINING X-RAY ENERGY SUBTRACTION IMAGES

BACKGROUND OF THE INVENTION

1. Field of the Invention

The present invention relates to a system for measuring energy subtraction images which is capable of selectively describing a target element using X-rays, and, more particularly, to an imaging system for obtaining energy subtraction images which can eliminate the occurrence of artifacts due to background components and which is suitable for use in the measurement of images at high speed.

2. Description of the Related Art

A system for measuring energy subtraction images which is capable of selectively depicting a target element is discussed in the passage from page 713 to page 718 of "Nuclear Instruments and Methods" in Physics Research A (1986). This system employs synchrotron radiation emitted from an X-ray source, and involves selective depiction of a target element which is attained by obtaining roentgenograms of a subject using monoenergetic X-rays containing X-rays having photon energy levels higher and lower than the K absorption edge of the target element and by calculating the subtraction images of these roentgenograms.

The above-described conventional technique requires rotation of a crystal spectroscope in order to switch over the level of the photon energy of X-rays, and has the following drawbacks.

Firstly, rotation of the crystal spectroscope changes the outgoing direction of the monoenergetic X-ray beam obtained by the crystal spectroscope, changing the direction in which the beam travels through a subject. This causes positions in the subject which are imaged using two types of X-ray photon energy to deviate from each other on a detecting surface. This means that calculation of the energy subtraction images is performed between picture elements which do not exactly correspond. This leads to the occurrence of artifacts, and correction of the positions is therefore necessitated. However, only the positions on the focal plane can be corrected with a high degree of accuracy, and a positioning error occurs with respect to the positions of the subject which are not located on the focal plane in proportion to the distance from the focal plane.

Secondly, in order to obtain an energy subtraction image, it is necessary to image the subject twice using X-rays of different energy levels for such a brief period of time that the movement of the subject can be ignored. In a cardiovascular case, energy level must be switched over within a period of 10 milliseconds or less. However, crystal spectroscopes generally employ a large monocrystal as a major component, and it is impossible to repeat rotation of and stop rotation of the crystal spectroscope in as short a period as 10 milliseconds or less.

Thirdly, the intensity and the monochromaticity of the monoenergetic X-rays obtained by a crystal spectroscope have an exclusive relationship. More specifically, when the intensity of the beam rises, the monochromaticity thereof deteriorates whereas when the monochromaticity improves, the beam intensity lowers. In a case where improvement of the beam intensity takes precedence over improvement of the monochromaticity, it is generally necessary to use X-rays with a large photon energy difference. However, it cannot be assumed that the absorption rates at which tissues other than the target element absorb the two types of X-ray beams may be regarded as the same, and the contrast of the background components cannot be completely eliminated by an energy subtraction image operation.

If X-rays having a small photon energy difference are used for measurement despite their low energy resolution, X-rays having an energy level higher than the K absorption edge and X-rays having an energy level lower than the K edge will be mixed with each other, resulting in a reduction in the contrast of the energy subtraction images and a deterioration in the detection limit of a target element. In the case of a spectroscope having excellent monochromaticity, the beam intensity is lowered, and the quantity of roentgenograms obtained in a short period of time is therefore reduced.

SUMMARY OF THE INVENTION

A primary object of the present invention is to provide an improved imaging system which enables the need for image positioning operations to be eliminated and the appearance of artifacts due to positioning errors to be prevented by an arrangement in which the photon energy of X-rays is switched over without rotating a crystal spectroscope. A second object of the present invention is to provide an imaging system which is capable of imaging twice at high speed. A third object of the present invention is to provide an imaging system which enables the contrast of a background component to be completely eliminated when a quasi-monoenergetic X-ray beam having low energy resolution is used.

The above-described objects of the present invention can be attained by performing the measurement and processes described below using a material containing a target element to be selectively depicted as a filter for filtering X-rays having a photon energy level higher than the absorption edge of the target element.

The concentration of the target element contained in the filter is adjusted such that the filter absorbs X-rays having a photon energy level lower than the absorption edge of the target element at a low rate and absorbs substantially all the X-rays having a photon energy level higher than the absorption edge.

An X-ray beam which contains X-rays having a certain bandwidth that extends above and below the absorption edge is irradiated from means capable of selecting the photon energy of X-rays, and a first imaging operation is performed with the target element filter removed from the X-ray beam path so that data $I_1$ can be obtained. Subsequently, the filter is disposed in the X-ray beam path for a brief period of time, and a second imaging operation is performed so as to obtain data $I_2$. Thereafter, the subject is removed, and a third imaging operation is performed with the filter removed to obtain data $I_3$. Lastly, the filter is disposed again in the optical path for a brief period of time, and data $I_4$ is obtained. The operation expressed by the following equation is conducted for each picture element using the obtained data $I_1$ to $I_4$ and the transmission rate T of the filter so as to obtain an energy subtraction image.

$$\ln\left(I_3 - \frac{I_4}{T}\right) - \ln\left(I_1 - \frac{I_2}{T}\right) - (\ln I_4 - \ln I_2)$$

Other features of the present invention will become apparent from the following description of the preferred embodiments thereof, taken in conjunction with the accompanying drawings.

DETAILED DESCRIPTION OF THE PREFERRED EMBODIMENTS

Figure 1:
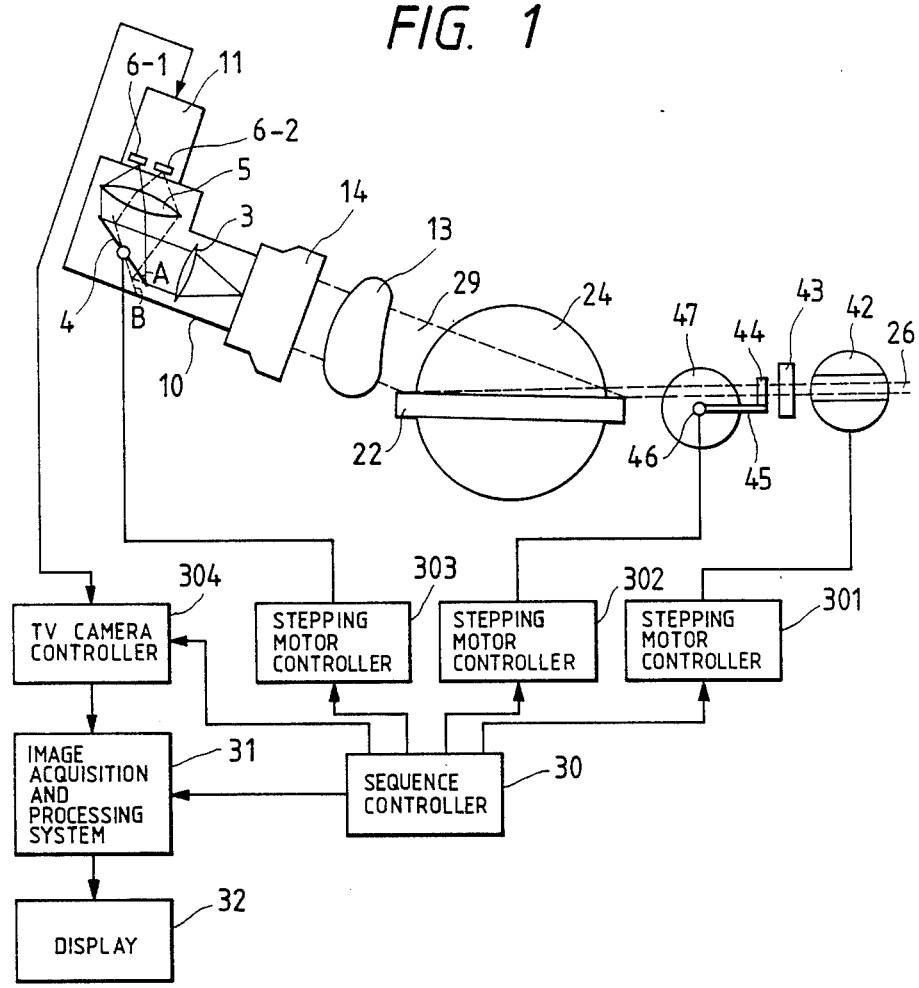
FIG. 1 is a block diagram of a first embodiment of the present invention.
Figure 2:
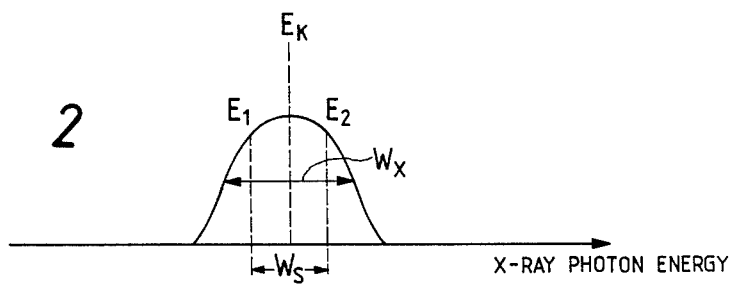
FIG. 2 shows a spectrum of a quasi-monoenergetic X-ray beam employed in the first embodiment.

A first embodiment of the present invention will be described below with reference to FIGS. 1 to 4. Referring first to FIG. 1 which shows the structure of the first embodiment, reference numeral 42 denotes a high speed rotary X-ray shutter which is a cylindrical metal bar having a rectangular through-hole therein. The high speed X-ray shutter 42 passes synchrotron radiation 26 therethrough only at the time of imaging, the synchrotron radiation 26 being blocked by the shutter 42 at other times. The illustration of FIG. 1 shows a state where the synchrotron radiation 26 is passing through the shutter. The radiation 26 is blocked when the shutter makes several turns from the state shown in FIG. 1. Reference numeral 43 designates a filter made of an aluminum plate for cutting X-rays having photon energy levels sufficiently lower than that of the absorption edge of an element to be depicted (which is iodine in this embodiment), which is not used in the imaging operation. Reference numeral 44 denotes a filter which is mainly formed of the objective element and which is characteristic of the present invention. The filter 44 is an iodine filter in this embodiment. The filter 44 is an aluminum plate having a thickness of 0.5 mm which is film coated with cesium iodine to a thickness of 0.2 mm. The iodine filter 44 is fixed to an arm 45, which is mounted on a rotary shaft 46 which extends perpendicular to the surface of the paper. The angle of rotation of the rotary shaft is controlled by a stepping motor 47. As the stepping motor 47 rotates by a predetermined angle, the iodine filter 44 moves up or down and thereby enters or goes out of an optical path of synchrotron radiation. The illustration of FIG. 1 shows a state where the iodine filter exists within the optical path. The synchrotron radiation which has passed through the iodine filter is made incident to a monocrystal spectroscope 22 in which a silicon (111) plane serves as a reflecting surface. The surface of the monocrystal is cut at an angle of 3 degrees and 7 minutes with respect to the (111) plane. The monocrystal spectroscope is positioned by a goniometer 24 such that the surface of the 7 monocrystal forms an angle of 0 degree and 18 minutes with respect to the radiation incident to the spectroscope. An X-ray beam 29 irradiated from the monocrystal spectroscope 22 when the iodine filter does not exist in the optical path is quasi-monoenergetic X-rays having a peak energy value which corresponds to that of the K absorption edge of iodine of 33.17 keV and containing X-rays having a photon energy range that extends above and below the K absorption edge, the quasi-monoenergetic X-rays having a bandwidth Wx which corresponds to a half width of about 500 eV. FIG. 2 shows the energy spectrum of the quasi-monoenergetic X-rays. In the figure, Ec denotes the K absorption edge energy (33.17 keV) of iodine. On the other hand, the X-ray beam 29 irradiated from the crystal spectroscope 22 when the iodine filter 44 exists in the optical path is quasi-monoenergetic X-rays which contain about 40% of photon energy component $E_1$ having photon energy levels lower than the K absorption edge and about 0.1% or less of photon energy component $E_2$ having photon energy levels higher than the K absorption edge.

Figure 3:
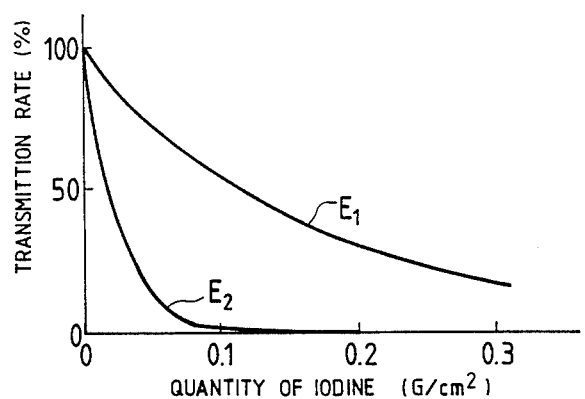
FIG. 3 shows the characteristics of a filter employed in the first embodiment.

FIG. 3 shows the relationship between the quantity of iodine contained per unit area of the iodine filter and absorption rate thereof. As can be seen from the graph, the above-described absorption characteristics of the iodine filter can be obtained when the quantity of iodine contained in the filter is about 0.15 g/1 cm².

Figure 4:
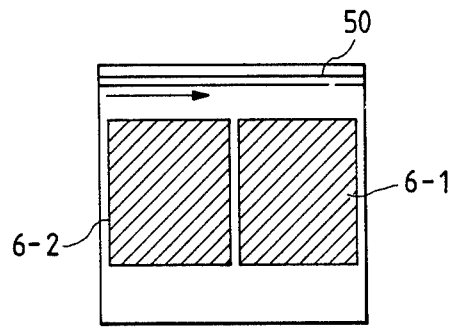
FIG. 4 is a plan view of an image accumulating area of the first embodiment.

The X-rays which have irradiated from the spectroscope 22 pass through a subject sample 13, and the X-rays that have passed through the subject 13 are then converted into a visible image by an X-ray image intensifier 14. The thus-obtained visible image is re-formed on the photoconductive layer of a TV camera 11 by an optical system 10. The optical system 10 includes a primary lens 3 for creating a beam made of parallel rays, a mirror 4 for reflecting the parallel beam provided by the primary lens 3, the mirror 4 being rotatable, and a secondary lens 5 for forming an image from the beam reflected by the mirror 4. When the mirror 4 is positioned at A indicated by the solid line, an image is formed at a position indicated by 6-1 on the scanning area of the photoconductive layer, whereas when the mirror 4 is positioned at B indicated by the dotted line, an image is formed at a position indicated by 6-2. FIG. 4 shows the scanning area of the photoconductive layer of a camera tube of the TV camera 11, i.e., the substantial imaging surface thereof, as well as the positions 6-1 and 6-2. Reference numeral 50 denotes an electronic beam scanning line. Turning back to FIG. 1, the image which is stored on the photoconductive layer is read out from the TV camera 11 as a time series signal by a TV camera controller 304 to an image acquisition and processing system 31 where it is converted to a digital signal, and this digital signal is then stored in a memory contained in the image acquisition and processing system 31. A sequence controller 30 generates a synchronizing signal which acts as a standard signal for the timing of measurement. A stepping motor controller 301 receives from the sequence controller 30 a predetermined number of pulses, and thereby operates the stepping motor to drive the high-speed X-ray shutter 42. A stepping motor controller 302 similarly operates the iodine filter controlling stepping motor 47. A stepping motor controller 303 similarly operates a stepping motor to drive the rotary mirror 4.

Imaging of a coronary artery will be performed using the above-described imaging system in the manner described below. A subject is fixed in such a manner that an objective coronary artery portion crosses the X-ray beam 29. Subsequently, a contrast agent containing iodine is injected through a vein, and measurement is started several seconds later.

Figure 5A:
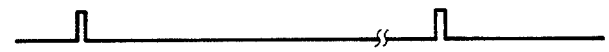
FIGS. 5 A to E are time charts, showing the operation of the first embodiment.
Figure 5B:
Figure 5C:
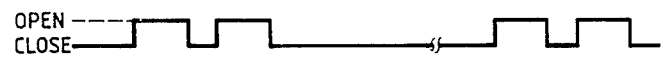
Figure 5D:
Figure 5E:

FIGS. 5A through E are time charts, showing the operating states of major components of the imaging system at the time of measurement. FIG. 5A shows the operation of a vertical synchronizing signal of the TV camera 11, FIG. 5B shows whether or not the iodine filter 44 is inserted, FIG. 5C shows the opening/closing state of the X-ray shutter 42, FIG. 5D shows the position of the rotary mirror 4, and FIG. 5E shows the timing of read-out scanning of the TV camera 11. First, in the state where the iodine filter is not in operation and where the rotary mirror 4 is positioned at A, the high-speed X-ray shutter 42 is opened, and an image is stored at the position 6-1 on the imaging surface of the TV camera. This image, which is called data $I_1$, is an image formed using an quasi-monoenergetic X-rays having the spectrum shown in FIG. 2. Next, the shutter 42 is closed, the iodine filter 44 is operated, and the rotary mirror 4 is positioned at B. The high-speed X-ray shutter 42 is opened in this state, and an image is stored at the position 6-2 on the imaging surface of the TV camera. This image, which is called data $I_2$, is an image formed using a quasi-monoenergetic X-ray beam. Next, the high-speed X-ray shutter 42 is closed, the iodine filter 44 and the rotary mirror 4 are respectively made in off state (not operated) and returned to the position A to make them ready for a next measurement, and the data $I_1$ and $I_2$ are stored in the memory by the read-out scanning signal of the TV camera 11. The above-described operation is successively repeated N times so as to obtain N pairs of data $I_1$ and $I_2$. After these measurements have been completed, the same measurements are conducted in a state where the subject is removed from the X-ray beam path. The obtained data are stored as data $I_3$ and $I_4$.

After all the measurements have been completed, a series of energy subtraction images are obtained by means of the operations conducted by the image acquisition and processing system 31. Details of those operations will be discussed below.

The physical structure of the data $I_1$ to $I_4$ are expressed as follows:

$$I_1 = I_h \cdot D_h \cdot \exp\left(-\sum_b \mu_{bh} \cdot t_b\right) \cdot \exp(-\mu_h \cdot t) +$$

$$I_l \cdot D_l \cdot \exp\left(-\sum_b \mu_{bl} \cdot t_b\right) \cdot \exp(-\mu_l \cdot t)$$

$$I_2 = T \cdot I_l \cdot D_l \cdot \exp\left(-\sum_b \mu_{bl} \cdot t_b\right) \cdot \exp(-\mu_l \cdot t)$$

$$I_3 = I_h \cdot D_h + I_l \cdot D_l$$

$$I_4 = T \cdot I_l \cdot D_l$$

where $I_h$: the intensity of X-rays having photon energy levels higher than the absorption edge, which is made incident to the subject when the objective element filter is not disposed in the optical path.

$I_l$: the intensity of X-rays having photon energy levels lower than the absorption edge, which is made incident to the subject when the objective element filter is not disposed, in the optical path.

T: the transmittance rate at which the objective element filter passes the X-rays having photon energy levels lower than the absorption edge.

$D_h$: the detection efficiency at which the detector detects the X-rays having photon energy levels higher than the absorption edge.

$D_l$: the detection efficiency at which the detector detects the X-rays having photon energy levels lower than the absorption edge.

$\mu_{bh}$: the mass absorption coefficient at which the background tissue other than the objective element in the subject absorbs the X-rays having photon energy levels higher than the absorption edge of the objective element.

$\mu_{bl}$: the mass absorption coefficient at which the background tissue other than the objective element in the subject absorbs the X-rays having photon energy levels lower than the absorption edge of the objective element.

$t_b$: the integral dose of the tissue in the subject other than the objective element which is located along the X-ray beam (unit: g/cm$^2$).

$\mu_h$: the absorption rate at which the objective element absorbs the X-rays having photon energy levels higher than the absorption edge.

$\mu_l$: the absorption rate at which the objective element absorbs the X-rays having photon energy levels lower than the absorption edge.

t: the integral dose of the objective element in the subject which is located along the X-ray beam (unit: g/cm$^2$).

Further, $_b\Sigma$ is the sum taken regarding the various tissues in the subject.

From the above-described equations which express data $I_1$ to $I_4$, we obtain $$t = \frac{\sum_b (\mu_{bh} - \mu_{bl}) \cdot t_b}{\mu_h - \mu_l} = \qquad \text{Equation (1)}$$

$$\frac{1}{\mu_h - \mu_l} \left[ \left\{ \ln\left(I_3 - \frac{I_4}{T}\right) - \ln\left(I_1 - \frac{I_2}{T}\right) \right\} - (\ln I_4 - \ln I_2) \right]$$

In the equation (1), it can be assumed that, when the difference in the photon energy between the X-rays having photon energy levels higher than the absorption edge and those having photon energy levels lower than the absorption edge is small, value $\mu_{bh}$ approximately becomes equal to value $\mu_{bl}$ regarding all the background components b, and the left side becomes equal to an absolute value t of the objective element in the subject.

Thus, the image acquisition and processing system performs an operation expressed by the following equation for each picture element using the obtained four types of image data $I_1$, $I_2$, $I_3$, and $I_4$ so as to obtain an energy subtraction image $I_E$.

$$I_E = \left\{ \ln\left(I_3 - \frac{I_4}{T}\right) - \ln\left(I_1 - \frac{I_2}{T}\right) \right\} - (\ln I_4 - \ln I_2) \qquad (2)$$

To simplify the above-described operation, measurement of data $I_3$ and $I_4$ is not performed, and the following equation is calculated for each picture element to obtain an energy subtraction image. The thus obtained image is an approximate image of the objective element image.

$$I_E' = \ln I_2 - \ln\left(I_1 - \frac{I_2}{T}\right) \quad (3)$$

Other various types of simplified operation may be employed.

In this embodiment, since the photon energy of X-rays employed for imaging an energy subtraction image can be switched over without rotating the crystal spectroscope, image positioning operation can be eliminated, and the occurrence of artifacts due to positioning errors can be prevented.

Further, the photon energy of X-rays can be switched over at high speed, and it is therefore possible, to obtain an energy subtraction image of a quickly moving subject sample.

Further, since the difference in the photon energy of the X-rays employed in the energy subtraction operation can be made small when compared with the energy resolution of the X-ray employed for imaging, even if a quasi-monoenergetic X-ray beam having degraded energy resolution is employed, the contrast of the background component can be substantially eliminated.

Figure 6:
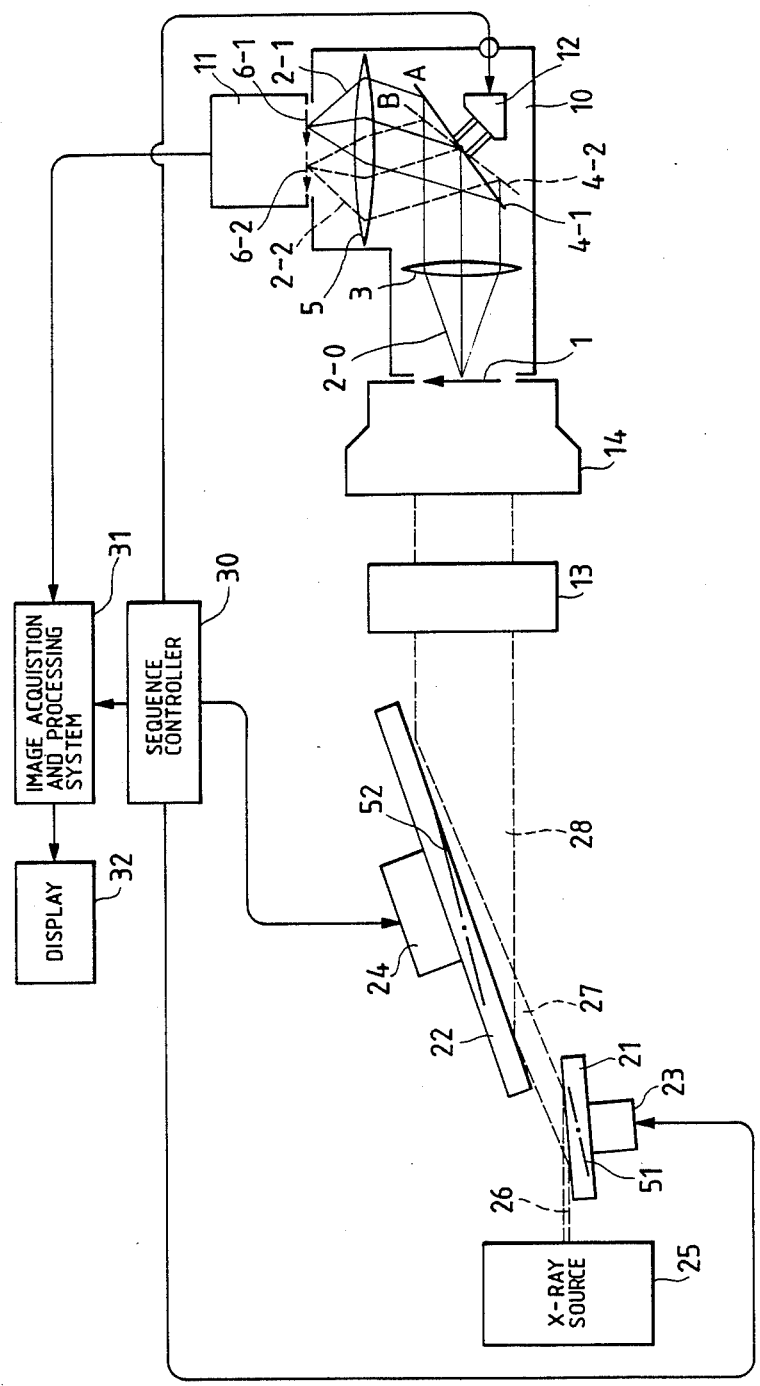
FIG. 6 is a block diagram of a second embodiment of the present invention.

FIG. 6 shows a second embodiment of the present invention. The second embodiment is the same as the embodiment shown in FIG. 1 except for the structure of a portion for generating an X-ray beam, that is, the X-ray image intensifier 14, the optical system 10, and the TV camera 11 have the same structure in the first and second embodiments. The second embodiment employs a two-crystal spectroscope which consists of crystals 21 and 22. The crystal 21 reflects a continuous energetic X-ray beam 26 irradiating from an X-ray source 25 and produces a monoenergetic X-ray beam 27 having a large width, and the crystal 22 reflects the monoenergetic X-ray beam 27 and creates a monoenergetic X-ray beam 28 having a larger width than that of the X-ray beam 27. The crystals 21 and 22 are respectively provided with angle adjusting mechanisms 23 and 24 which change the angle of the crystals so as to switch over the photon energy of the X-ray beam which irradiates onto the subject 13. Further, the two-crystal spectroscope also serves as an X-ray shutter. In order to produce X-rays having a certain photon energy level from the crystal 22, Bragg condition must be satisfied at the crystals 21 and 22 with respect to the X-rays having that energy level. In other words, when the incident X-ray beam 26 and the outgoing X-ray beam 28 are parallel and when the crystals 21, 22 are made of the same material, the direction of the crystal plane of the crystal 21 which is indicated by 51 must be parallel to the direction of the crystal plane of the crystal 22 which is indicated by 52. The energy of the outgoing X-ray beam 28 is changed by changing the directions of the crystals 21 and 22 while maintaining the crystals 21 and 22 parallel. If the crystals 21 and 22 are not parallel, i.e., if the direction of one of the crystals changes slightly, Bragg condition is not satisfied, and no X-ray beam goes out of the crystal 22 except for a very small amount of scattering X-ray beam. The two-crystal spectroscope therefore works as an X-ray shutter.

The rotary mirror 4 of the optical system 10 can be positioned at C (which is not shown) other than at A and B shown in FIG. 6 where it does not form an image anywhere on the scanning area of the photoconductive layer of the TV camera 11, i.e., substantially the imaging surface of the TV camera 11. This makes the rotary mirror act as an optical shutter. Reference numeral 12 denotes a driving portion of the rotary mirror. If a piezoelectric element is used as the driving portion, a high speed drive is possible.

Figure 7A:
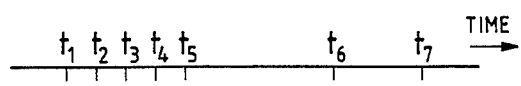
FIGS. 7 A to E are time charts, showing the operation of the second embodiment.
Figure 7B:
Figure 7C:
Figure 7D:
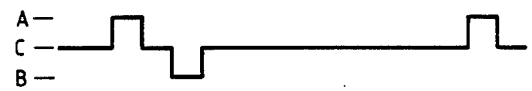

The operation of the embodiment shown in FIG. 6 will be described below with reference to FIGS. 7A to D, in which FIG. 7A shows a vertical synchronizing signal for the TV camera 11, FIG. 7B shows switchover operation of the X-ray energy conducted by the two-crystal spectroscope and the operation of the two-crystal spectroscope as an X-ray shutter, FIG. 7C shows the position of the rotary mirror 4, and FIG. 7D shows the image read-out period of the TV camera 11.

In the time charts shown in FIG. 7, the energy level of the monoenergetic X-rays is made lower than that of the K absorption edge of iodine from time $t_1$ to time $t_2$, and X-rays are irradiated on an object. At this time, the rotary mirror 4 is positioned at A so that an image is formed and stored on the photoconductive layer at position 6-1. From time $t_2$ to $t_3$, the angle of the spectroscope is switched over. During this time, the rotary mirror 4 is positioned at C so that no image is formed on the imaging surface of the TV camera. Further, the spectroscope is used as an X-ray shutter during this time so as to prevent unnecessary X-rays from irradiating onto the object. In a period indicated by the broken line in FIG. 7B, the two-crystal spectroscope is used as the X-ray shutter so as to block X-rays, and in a period indicated by the solid line, it satisfies Bragg rule and passes X-rays. Next, from $t_3$ to $t_4$, the angle of the spectroscope is fixed so that it produces monoenergetic X-rays having a energy level higher than the K absorption edge of iodine, and the rotary mirror 4 is positioned at B so that an image is formed and stored on the photoconductive layer at position 6-2. From $t_4$ to $t_6$, the scanning area on the photoconductive layer of the TV camera 11 is scanned by an electron beam so as to read out the two types of image stored. During this time, the energy of X-rays is switched over in the spectroscope so as to get it ready for a subsequent imaging operation which is conducted using monoenergetic X-rays having a low energy level. However, the spectroscope acts as an X-ray shutter until time $t_7$ when storage of an image is started, and prevents the subject from being exposed to X-rays. Further, the rotary mirror 4 is positioned at C from $t_4$ to $t_7$, and prevents light from entering the TV camera.

Thus, two images of monoenergetic X-rays having energy levels higher and lower than the K absorption edge of iodine can be obtained at an interval of $(t_3 - t_1)$. This $(t_4 - t_1)$ is $\frac{1}{4}$ or less of one frame period $(t_7 - t_1)$. For example, if one frame period is 33.3 milliseconds, two images can be obtained at an interval of about 8 milliseconds. Further, continuous imaging is possible with one frame serving as one vertical synchronization period and with two images serving as one unit.

A difference between the pair of thus obtained high energy and low energy images is calculated so as to obtain an image representing distribution of only contrast agent which has been injected into the subject. In order to obtain a complete subtraction image, this embodiment involves removal of an after image of an X-ray image intensifier, this process being described below.

Figure 8:
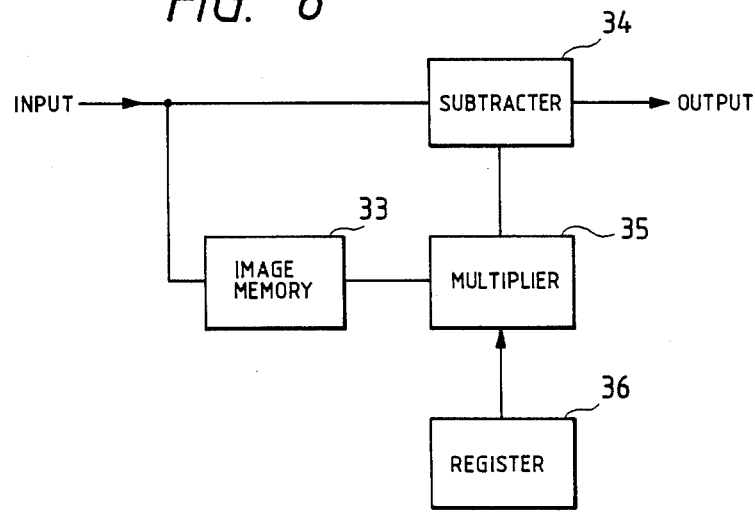
FIG. 8 is a block diagram, showing the correction operation performed in the embodiment of FIG. 6.

FIG. 8 shows a residual image removal processing portion which is incorporated in the image acquisition and processing system 31. This residual image removal processing portion includes a subtracter 34 which performs subtraction on the picture elements which correspond to each other, a multiplier 35 for multiplying each of the picture elements in the image memory by a constant coefficient, and a register 36 for retaining a constant coefficient.

Figure 9:
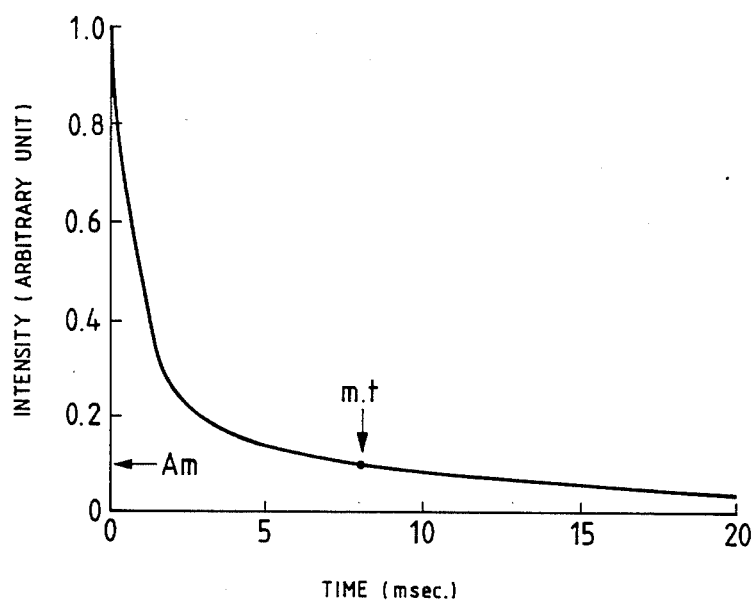
FIG. 9 shows the characteristics of the correction operation of the embodiment of FIG. 6.

The coefficient to be retained in the coefficient retaining register is obtained in the manner described below. FIG. 9 shows the residual image characteristics of X-rays II. When the irradiation of X-rays is stopped in 0 millisecond on the abscissa, the intensity of a visible image which is output (axis of ordinates representing the intensity of X-ray radiation which is expressed relative to that of the irradiating X-rays) is attenuated, as shown in the graph. In this embodiment, the interval at which two images are obtained is $(t_3 - t_1)$, which corresponds to m·t in the graph, and the residual intensity An at this time represents the residual components of the low energy image which are mixed in the high energy image. Therefore, a value Am of the residual intensity at m·t corresponding to time $(t_3 - t_1)$ which is expressed relative to that of the irradiating X-ray is measured and retained in the coefficient retaining register as a coefficient.

Actual image processing will be performed as follows: data representing a low energy image is first stored in the image memory. Next, the multiplier 35 multiplies all the picture elements in the image data by the coefficient in the coefficient retaining register, Am, and this result is then subtracted by the subtracter 34 from the data representing the high energy image which is input, so as to provide a high energy image from which the residual image of the low energy image has been removed.

After the residual image removal processing has been completed, a difference between the high energy image, which contains no residual image, and the low energy image is calculated so as to obtain an objective energy subtraction image.

A further complete subtraction image may be obtained if the image components of the scattering X-ray contained in the high and low energy images are removed before the above-described residual image removal processing is performed. In that case, in addition to the imaging operation of the two images described with reference to FIGS. 7A to D, the subject is imaged in a state where the two crystal spectroscope is serving as an X-ray shutter, and this image is stored in the image acquisition and processing system. This image is then subtracted from both of the high and low energy images obtained by the imaging operation shown in FIG. 7 so as to provide images of pure monoenergetic X-rays.

What is claimed is:

1. An imaging system for selectively depicting the distribution of a target element injected into a subject as an energy subtraction image, comprising:
    a source for irradiating a radiation beam toward said subject;
    an energy selecting means for selecting quasi-monoenergetic X-rays having photon energy in a range extending above and below an absorption edge of said target element from said radiation beam;
    a filter that is disposable in an optical path of said radiation beam which irradiates said subject, said filter containing said target element and having the function of substantially cutting X-rays having photon energy levels higher than said absorption edge;
    an X ray image detecting means disposed behind said subject;
    a control means for controlling said filter and said X-ray image detecting means such that a first image of said subject by means of said quasi-monoenergetic X-rays irradiated when said filter is removed and a second image of said subject by means of said quasi-monoenergetic X-rays irradiated when said filter is inserted are successively obtained; and
    an image acquisition and processing means containing a recording means for recording the images obtained by said X-ray image detecting means, said image acquisition and processing means calculating an energy subtraction image using said first and said second images which have been recorded.

2. An imaging system according to claim 1, wherein said energy selecting means is a crystal spectroscope.

3. An imaging system according to claim 1, wherein said X-ray image detecting means includes an X-ray image intensifier for intensifying an X-ray image and converting it into an optical image, and an optical system for focusing said optical image on the imaging surface of an TV camera, said optical system focusing said first and second images at different positions on the imaging surface of said TV camera.

4. An imaging system according to claim 3, wherein said optical system has an optical lens and a plane mirror, and changes the position at which an image is focused on the imaging surface of said TV camera by changing the angle of said plane mirror.

5. An imaging system for selectively depicting the distribution of a target element injected into a subject as an energy subtraction image, comprising:
    a source for irradiating a radiation beam toward said subject;
    an energy selecting means for selecting quasi-monoenergetic X-rays having photon energy in a range extending above and below an absorption edge of said target element from said radiation beam;
    a filter that is disposable in an optical path of said radiation beam which irradiates said subject, said filter containing said target element and having the function of substantially cutting X-rays having photon energy higher than said absorption edge and of passing X-rays having photon energy lower than said absorption edge with a certain transmittance value;
    an X-ray image detecting means disposed behind said subject;
    a control means for controlling said filter and said X-ray image detecting means such that a first image of said subject by means of said quasi-monoenergetic X-rays irradiated when said filter is removed and a second image of said subject by means of said quasi-monoenergetic X-rays irradiated when said filter is inserted, a third image when said filter and said subject are removed, and a fourth image when said filter is inserted and said subject is removed are successively obtained; and
    an image acquisition and processing means containing a recording means for recording the images obtained by said X-ray image detecting means, said image acquisition and processing means calculating an energy subtraction image using said first second, third and fourth images which have been recorded and said transmittance value of said filter.

6. An imaging system for selectively depicting the distribution of a target element injected into a subject as an energy subtraction image, comprising:
 a source for irradiating a radiation beam toward said subject;
 a two-crystal spectroscope provided in an optical path of said radiation beam, said two-crystal spectroscope converting said radiation beam by the change in a reflecting angle thereof into either a first monoenergetic X-ray beam having a photon energy level lower than the absorption edge of said target element or a second monoenergetic X-ray beam having a photon energy level higher than said absorption edge and producing it;
 an X-ray image detecting means including an X-ray image intensifier for converting the X-ray image of said subject into an optical image, an optical system for focusing said optical image, and a TV camera for imaging the focused image, said optical system focusing a first image by said first monoenergetic X-ray beam and a second image by said second monoenergetic X-ray beam at different positions on the imaging surface of said TV camera; and
 an image acquisition and processing means for recording both of said first and second images which are read out from said X-ray image detecting means and for calculating an energy subtraction image by the operation of difference between said both images.

7. An imaging system according to claim 6, wherein the reflecting conditions of the two crystals of said two-crystal spectroscope are made to disagree with each other during a period other than the imaging period of said X-ray image detecting means so as to allow said two-crystal spectroscope to act as an X-ray shutter.

8. An imaging system according to claim 6, wherein said optical system re-forms an output image of said X-ray image intensifier in a period other than the period in which said first and second images are imaged, at a position outside of the imaging surface of said TV camera.

9. An imaging system according to claim 6, wherein image acquisition and processing means includes a means for calculating only an image obtained by the present imaging operation by subtracting an image signal corresponding to the residual component of an image obtained by a preceding imaging operation due to the residual image of said X-ray image intensifier from an image signal which is read out from said TV camera.

10. An imaging system for selectively depicting the distribution of a target element injected into a subject as an energy subtraction image, comprising:
 a source for irradiating a radiation beam toward said subject;
 an energy selecting means for selecting quasi-monoenergetic X-rays having photon energy in a range extending above and below an absorption edge of said target element from said radiation beam;
 a filter that is disposable in an optical path of said radiation beam which irradiates said subject, said filter containing said target element and having the function of substantially cutting X-rays having photon energy higher than said absorption edge and of passing X-rays having photon energy lower than said absorption edge with a certain transmittance value;
 an X-ray image detecting means disposed behind said subject;
 a control means for controlling said filter and said X-ray image detecting means such that a first image of said subject by means of said quasi-monoenergetic X-rays irradiated when said filter is removed and a second image of said subject by means of said quasi-monoenergetic X-rays irradiated when said filter is inserted are successively obtained; and
 an image acquisition and processing means containing a recording means for recording the images obtained by said X-ray image detecting means, said image acquisition and processing means calculating an energy subtraction image using said first and said second images which have been recorded and said transmittance value of said filter.

11. An imaging system according to claim 10, wherein said energy selecting means is a crystal spectroscope.

12. An imaging system according to claim 10, wherein said X-ray image detecting means includes an X-ray image intensifier for intensifying an X-ray image and converting it into an optical image, and an optical system for focusing said optical image on the imaging surface of an Tv camera, said optical system focusing said first and second images at different positions on the imaging surface of said TV camera.

13. An imaging system according to claim 12, where said optical system has an optical lens and a plane mirror, and changes the position at which an image is focused on the imaging surface of said TV camera by changing the angle of said plane mirror.

* * * * *